Dec. 24, 1968  J. DUNAY  3,418,502
OSCILLATORY MOTOR
Filed May 17, 1966  2 Sheets-Sheet 1
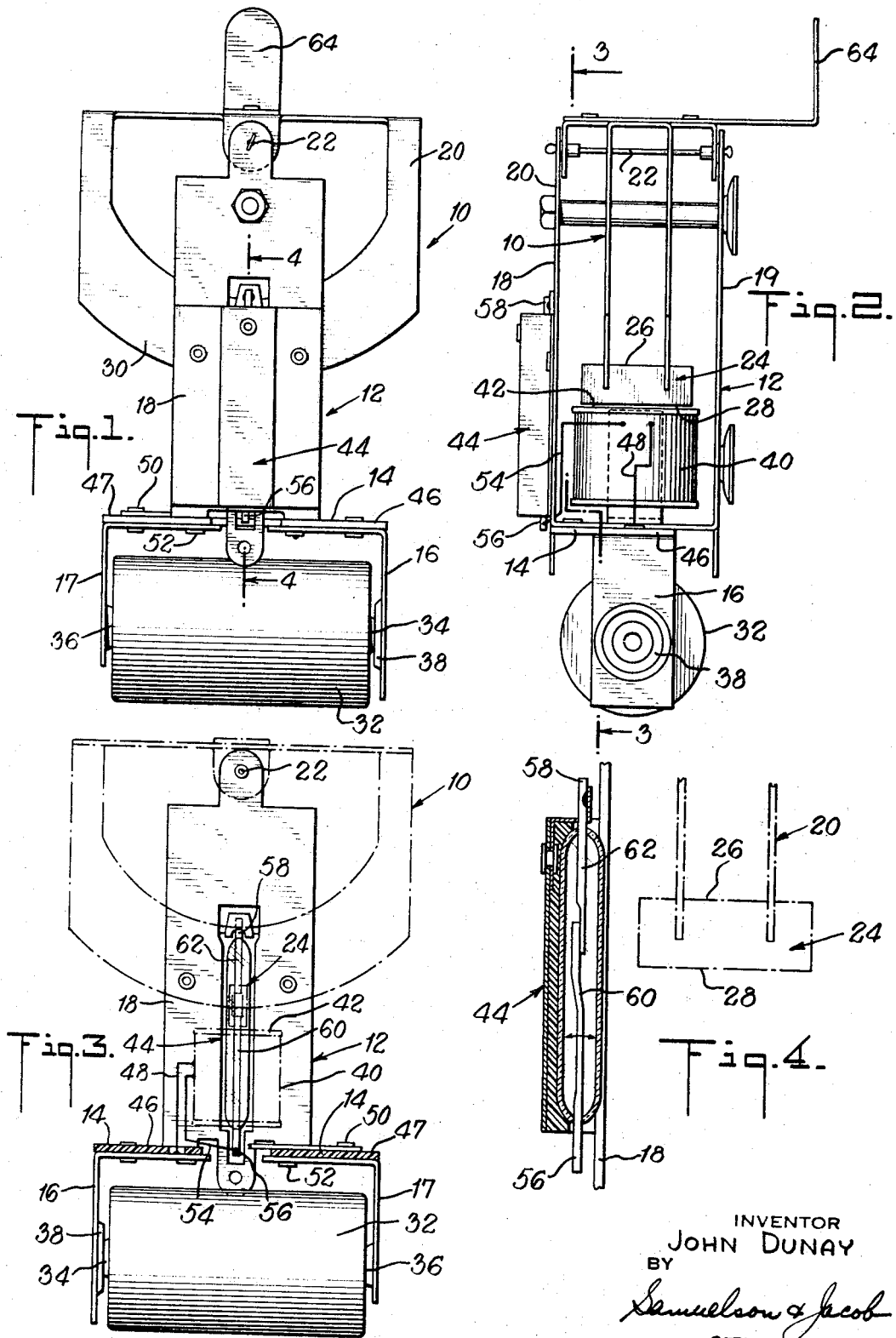
INVENTOR
JOHN DUNAY
BY
Samuelson & Jacob
ATTORNEYS

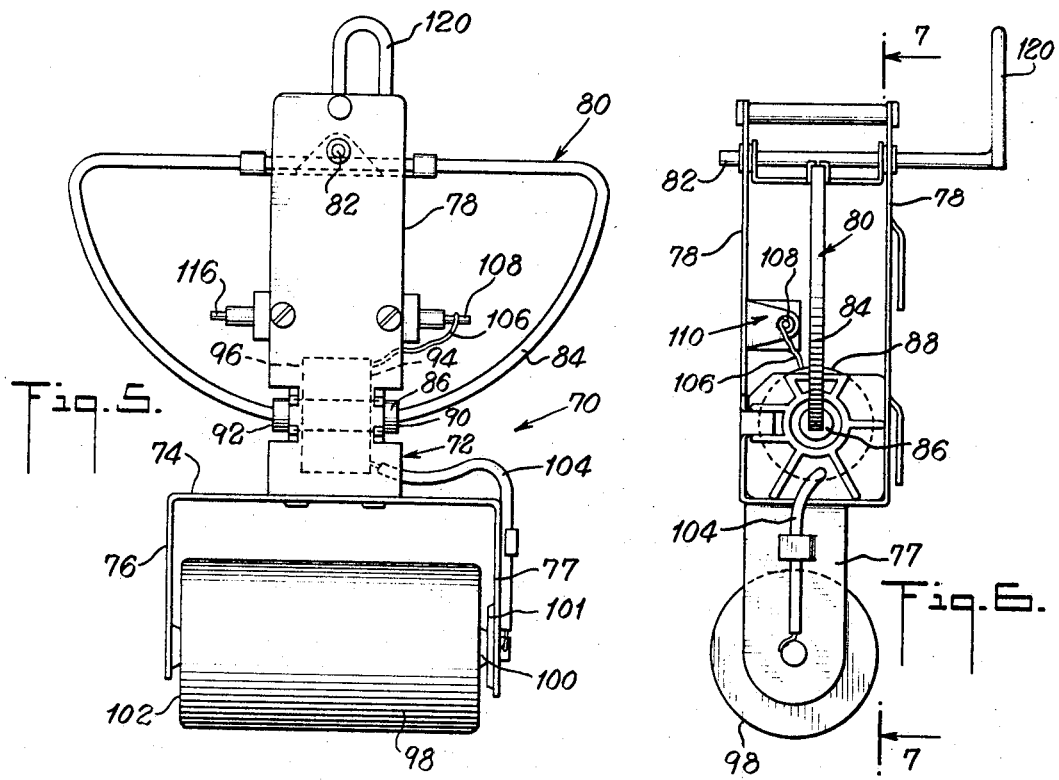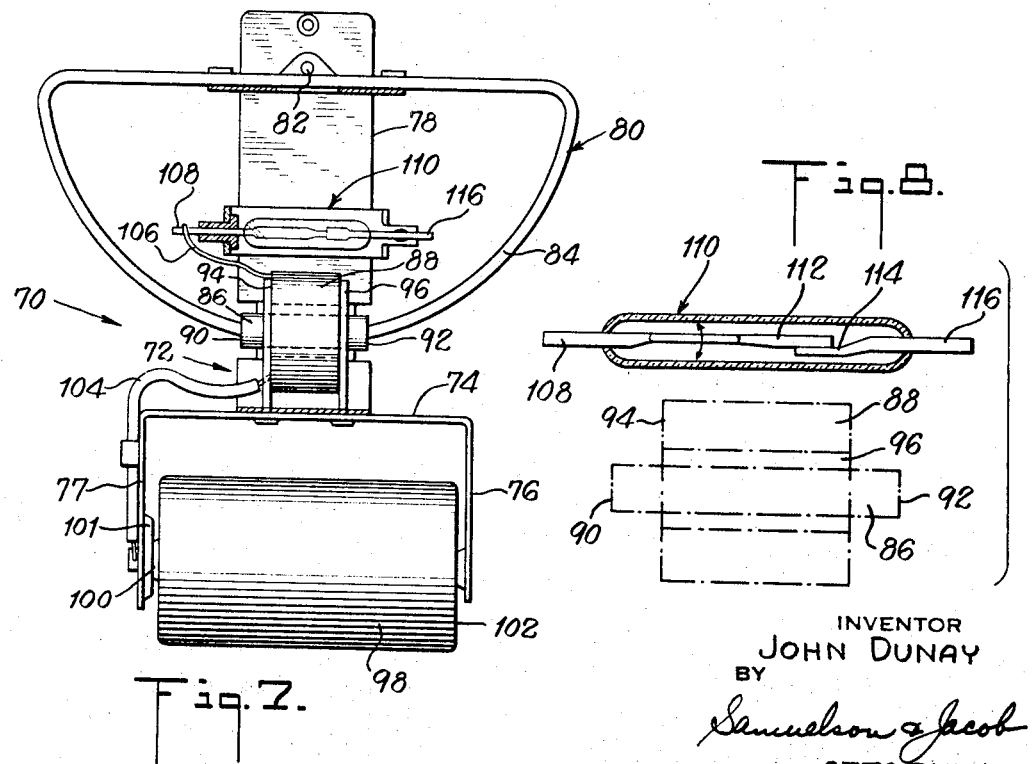

United States Patent Office 3,418,502
Patented Dec. 24, 1968

3,418,502
OSCILLATORY MOTOR
John Dunay, New Milford, N.J., assignor of fifty percent to Leonard C. Nachtman, Woodside, N.Y.
Filed May 17, 1966, Ser. No. 550,855
6 Claims. (Cl. 310—32)

The invention relates to oscillatory motors and in particular to those motors which are used for display purposes wherein a pivotable yoke is given continuing oscillatory movement by the operation of the motor.

In the prior art there have been many types of oscillatory motors in which a magnet carried on a pivotable arm is repelled by an electromagnet which is actuated when the magnet is in close proximity thereto. Most of these prior art motors employed a mechanically actuated switch to close the electrical circuit to the electromagnetic coil. Various techniques have been used to ensure that contact is made and broken at the proper times but all these mechanically operated switches carbonized relatively quickly and rendered the motor inoperative.

As a consequence, there has been a continuing need for a more reliable oscillatory motor which would operate for long periods of time and would draw very small amounts of current from the battery. Accordingly, it is an important object of the invention to provide an oscillatory motor in which the switch is closed due to the proximity of the magnetic field of the magnet which is mounted on the oscillating portion of the motor.

It is a further object of the invention to provide such a motor wherein the oscillating yoke passes through the electromagnetic coil and the magnet mounted on the yoke also passes through the electromagnetic coil.

It is a still further object of the invention to provide such a motor wherein the magnet is mounted on the oscillating yoke such that the polarity of its lower end is the same as that of the upper end of the electromagnetic coil.

It is a still further object of the invention to provide such a motor wherein there are a pair of downwardly-projecting, polarized tabs for receiving the dry-cell battery used for actuating the motor.

These and other objects, advantages, features and uses will be apparent during the course of the following description when taken in conjunction with the accompanying drawings wherein:

FIGURE 1 is a front elevational view of a preferred embodiment of oscillatory motor of the invention;

FIGURE 2 is an end elevational view of the oscillatory motor of FIGURE 1;

FIGURE 3 is a sectional view taken on the lines 3—3 of FIGURE 2, viewed in the direction of the arrows;

FIGURE 4 is an enlarged sectional view taken along the lines 4—4 of FIGURE 1, viewed in the direction of the arrows;

FIGURE 5 is a view, similar to that of FIGURE 1, of an alternative embodiment of oscillatory motor of the invention;

FIGURE 6 is an end elevational view of the oscillatory motor of FIGURE 5;

FIGURE 7 is a sectional view taken on the lines 7—7 of FIGURE 6, viewed in the direction of the arrows; and FIGURE 8 is an enlarged front elevational view, showing the position of the electromagnetic coil, the magnet and the magnetic switch.

In the drawings, wherein, for the purpose of illustration, are shown two embodiments of the invention, the numeral 10 designates a preferred embodiment of oscillatory motor of the invention. Motor 10 is seen to comprise (FIGURES 1–4) frame 12 having a floor 14, a pair of spaced-apart, polarized tabs 16 and 17 projecting downwardly from floor 14 and a pair of spaced-apart legs 18 and 19 projecting upwardly from floor 14. Arcuate yoke 20 is mounted so as to be pivotable about pin 22 which is held between the upper ends of legs 18 and 19. Magnet 24 is affixed to arcuate yoke 20 at the center of the arc 30. Magnet 24 is magnetized so that end 26 has one magnetic polarity and end 28 is of the opposite polarity.

Dry-cell battery 32 is the source of D-C voltage and is held between tabs 16 and 17 so that its positive terminal 34 is connected to terminal 38 on tab 16 and its negative terminal 36 is connected to tab 17. Electromagnetic coil 40 is mounted on floor 14 so that when power is applied to it, its end 42 is of the same magnetic polarity as end 28 of magnet 24. Magnetic switch 44 is mounted on leg 18 and its purpose will be described as this description proceeds.

Tab 16 and consequently terminal 38, which is struck therefrom, are insulated from the balance of frame 12 by means of insulator 46. Electrical connection is made from tab 16 to electromagnetic coil 40 by means of wire 48. Electrical connection is made from tab 17 to the frame 12 by means of rivets 50 and 52 which pass through insulation 47 and make positive electrical contact with tab 17 and frame 12. Wire 54 connects the other side of electromagnetic coil 40 to one terminal 56 of magnetic switch 44 and the other terminal 58 of magnetic switch 44 is connected directly to frame 12. Thus, when switch 44 is closed, there is an electrical circuit from the battery 32 through the switch 44 and the electromagnetic coil 40 and a magnetic field surrounds the coil.

Magnetic switch 44 is preferably of the glass enclosed type which is partially evacuated or filled with inert gas to eliminate arcing and corroding. Switch 44 is of the type commonly referred to as a "dry reed switch." It closes when subjected to a magnetic field of a higher value than that on which it opens. As a result, it stays closed as the magnet moves away from the coil until the "opening" value is reached. Upon its return swing toward the coil, it remains open until the higher "closing" value is reached. Switch 44 is placed so that the effect of the field of the coil upon it is minimized. It is located so that its operation is not materially affected by the field of the coil.

At least a portion of contact arm 60 of which 44 is formed of magnetic material so that contact arm 60 is brought into contact with contact 62 when magnet 24 is close to switch 44. When magnet 24 moves away from close proximity to switch 44, contact arm 60, which is spring biased, moves away from contact 62 and the circuit is opened. Arm 64 is affixed to yoke 20 so that it oscillates as yoke 20 moves back and forth about its pivot 22. A suitable display may be connected to arm 64 so that it moves under the influence of the oscillatory motor of the invention.

Operation proceeds as follows: battery 32 is inserted between tabs 16 and 17, which serve as the polarized electrical terminals, in the proper polarity and yoke 20 is moved manually so that magnet 24 is displaced from its position of rest over coil 40. The yoke moves in a pendulous arc and when it reaches its uppermost position, it starts back in the other direction under the influence of the force of gravity. As magnet 24 moves into close proximity with switch 44, it causes contact 60 to close against contact 62 thereby closing the circuit to coil 40 so that it becomes magnetized and its end 42 is of the same magnetic polarity as end 28 of magnet 24.

This causes magnet 24 to be repelled away from coil 40 so that the yoke continues to move in its pendulous path toward the opposite side from which it started. When magnet 24 reaches a point at which its magnetic field at switch 44 is below the "opening" value, switch 44 opens. When magnet 24 reaches the top of its travel, it now moves down toward the coil and the action just decribed is repeated. The movement of the yoke and its attached display moves in this to and fro movement until the battery runs down rather than when the switch contacts pit and corrode as is common when open, mechanically operated switches are used.

It is to be noted that the magnet performs two functions; first, it serves to close and open the magnetic switch and thereby apply power to the coil, as required; and second, it is repelled by the magnetic field of the coil so that is urges the yoke to oscillate about its pivot. If the battery is inserted between the tabs with its polarity reversed so that the D-C voltage is reversed, the magnetic poles at the lower end of the magnet and the upper end of the coil would be opposite and they would be attracted to each other thereby preventing the yoke from oscillating.

Oscillatory motor 70 (FIGURES 5–8) is seen to comprise frame 72 which has a floor 74, a pair of spaced-apart, polarized tabs 76 and 77 projecting downwardly from the floor and a pair of spaced-apart legs 78 projecting upwardly from the floor. Arcuate yoke 80 is mounted so as to be movable about pivot 82 which is held in position at upper ends of spaced-apart legs 78. Permanent magnet 86 is mounted at the center of arc 84 of yoke 80. When the yoke is in a position of rest, magnet 86 is within electromagnetic coil 88 which is mounted on floor 74. Magnet 86 is magnetized so that ends 90 and 92 are of opposite polarity. Electromagnetic coil 88 is normally connected so that when power of the correct polarity is applied to it, end 94 is opposite in polarity to end 90 of the magnet and end 96 is opposite in polarity to end 92 of the magnet.

Dry-cell battery 98 constitutes the source of D-C voltage and is inserted between tabs 76 and 77, which serve as the polarized electrical terminals, so that its positive terminal 100 makes contact with terminal 101 on tab 77 and its negative terminal 102 makes contact with tab 76. Terminal 101 is suitably insulated from tab 77 to prevent the battery from being short-circuited as the frame 72 is made of conductive material throughout. Lead 104 is connected between terminal 101 and one side of electromagnetic coil 88 and wire 106 is connected to terminal 108 of magnetic switch 110. Magnetic switch 110 is of a type similar to switch 44, is mounted on one of the legs 78 and is placed so that when magnet 86 is in close proximity thereto (within coil 88), contact 112 is drawn into contact with contact 114. Terminal 116 of switch 110 is connected directly to frame 72 so that when switch 110 is closed, the circuit from the battery is completed through the switch and electromagnetic coil. Contact 112 is spring biased so that it moves away from contact 114 when the magnetic field is reduced by the movement of magnet 86 away from coil 88. Magnetic switch 110 is placed so that the effect on it of the magnetic field of the coil is minimized.

Operation proceeds as follows: the battery is inserted between the tabs so that the polarity is correct and the yoke is moved manually so that the magnet is outside the coil and released. The force of gravity causes the yoke to move downwardly toward the coil and the priximity of the magnet to the switch causes the switch to close. This energizes the coil and sets up a magnetic field surrounding the coil and as the magnet passes through the coil due to its inertial motion, it is repelled out of the coil until it reaches a peak position on the opposite side from which it started. It now starts down toward the floor and the previously-described action is repeated. The yoke continues to oscillate until the battery runs down. Arm 120 is affixed to yoke 80 and oscillates in conjunction therewith. Any suitable display may be affixed to arm 120.

If the polarity of battery 98 is reversed so that the D-C voltage is reversed, magnet 86 will not be repelled through coil 88 but instead will lock in a position within the coil.

As various changes could be made in the above constructions without departing from the scope of the invention, it is intended that all matter contained in the above description or shown in the accompanying drawings shall be interpreted as illustrative and not in a limiting sense.

What is claimed is:

1. An oscillatory motor comprising:
   a frame having a floor, a pair of spaced-apart legs projecting upwardly from the floor, and a pair of polarized electrical terminals;
   an electromagnetic coil mounted on the floor between the spaced-apart legs;
   an arcuate yoke pivotably mounted adjacent the upper portion of the spaced-apart legs such that in its rest position the center of its arc is closest to the electromagnetic coil;
   a magnet mounted at the center of the arc of the arcuate yoke;
   a source of D-C voltage inserted between the pair of polarized electrical terminals;
   a magnetic switch mounted on one of the legs and connected to the source of D-C voltage and the electromagnetic coil such that when the magnet is in close proximity with the magnetic switch, the magnetic switch is closed and power from the source of D-C voltage is applied to the coil;
   the polarity of the magnet being such that the magnet is repelled by the electromagnetic coil when power is applied thereto to thereby cause the pivotable, arcuate yoke to oscillate back and forth with respect to the electromagnetic coil.

2. An oscillatory motor as described in claim 1 wherein the magnet is a bar magnet with a magnet pole at the lower extremity thereof and the eletromagnetic coil is mounted such that when power is applied thereto, the polarity of its upper end is the same as the polarity of the lower extremity of the magnet.

3. An oscillatory motor as described in claim 1 wherein the electromagnetic coil is mounted such that the arcuate yoke and the magnet mounted thereon pass through the center thereof and the ends of the magnet are opposite in polarity to those of the corresponding ends of the electromagnetic coil when power is applied to the electromagnetic coil.

4. An oscillatory motor as described in claim 1 wherein the pair of polarized electrical terminals is a pair of spaced-apart, polarized tabs projecting downwardly from the floor and the source of D-C voltage is a battery inserted between the spaced-apart, polarized tabs.

5. An oscillatory motor as described in claim 4 wherein the magnet is a bar magnet with a magnet pole at the lower extremity thereof and the electromagnetic coil is mounted such that when power is applied thereto, the polarity of its upper end is the same as the polarity of the lower extremity of the magnet.

6. An oscillatory motor as described in claim 4 wherein the electromagnetic coil is mounted such that the arcuate yoke and the magnet mounted thereon pass through the center thereof and the ends of the magnet are opposite in polarity to those of the corresponding ends of the electromagnetic coil when power is applied to the electromagnetic coil.

References Cited

UNITED STATES PATENTS

| 2,428,247 | 9/1947 | Scotts et al. | 310—39 |
| 2,583,741 | 1/1952 | Kiler | 310—32 XR |
| 2,747,114 | 5/1956 | Reitz | 310—32 |
| 2,833,943 | 5/1958 | Anthony | 310—32 |
| 3,214,854 | 1/1965 | Swan | 335—154 XR |
| 3,238,525 | 3/1966 | Humphreys et al. | 310—34 |

J. D. MILLER, *Primary Examiner.*

D. F. DUGGAN, *Assistant Examiner.*

U.S. Cl. X.R.

310—39; 335—154